US010314401B2

(12) United States Patent
Schwerma et al.

(10) Patent No.: US 10,314,401 B2
(45) Date of Patent: Jun. 11, 2019

(54) SEAT ASSEMBLY HAVING AN ADJUSTABLE HEAD RESTRAINT ASSEMBLY

(71) Applicant: Lear Corporation, Southfield, MI (US)

(72) Inventors: Bernd Rolf Schwerma, Neuburg (DE); Florian Diefenthaler, Oberding-Schwaig (DE); Stefan Brunner, Freising (DE); Thomas Peklo, Oberding-Schwaig (DE)

(73) Assignee: Lear Corporation, Southfield, MI (US)

( * ) Notice: Subject to any disclaimer, the term of this patent is extended or adjusted under 35 U.S.C. 154(b) by 117 days.

(21) Appl. No.: 15/649,397

(22) Filed: Jul. 13, 2017

(65) Prior Publication Data

US 2018/0022249 A1 Jan. 25, 2018

Related U.S. Application Data

(60) Provisional application No. 62/364,435, filed on Jul. 20, 2016.

(30) Foreign Application Priority Data

Jul. 10, 2017 (DE) .................. 10 2017 211 720

(51) Int. Cl.
*A47C 7/38* (2006.01)
*B60N 2/815* (2018.01)
*B60N 2/865* (2018.01)
*B60N 2/897* (2018.01)

(52) U.S. Cl.
CPC ............... *A47C 7/38* (2013.01); *B60N 2/815* (2018.02); *B60N 2/865* (2018.02); *B60N 2/897* (2018.02)

(58) Field of Classification Search
CPC .......... A47C 7/38; B60N 2/865; B60N 2/815; B60N 2/897; B60N 2/806; B60N 2/809
USPC ........................................ 297/410, 406, 407
See application file for complete search history.

(56) References Cited

U.S. PATENT DOCUMENTS

| 3,563,602 | A |   | 2/1971  | Ohta |
|-----------|---|---|---------|------|
| 3,572,831 | A |   | 3/1971  | Barecki |
| 3,608,965 | A |   | 9/1971  | Cziptschirsch |
| 4,191,422 | A | * | 3/1980  | Inasawa ................. B60N 2/865 297/391 |
| 4,671,573 | A |   | 6/1987  | Nemoto et al. |
| 4,779,929 | A |   | 10/1988 | Kuechemann |

(Continued)

FOREIGN PATENT DOCUMENTS

| CN | 104395142 A | 3/2015 |
| CN | 104608666 A | 5/2015 |

(Continued)

OTHER PUBLICATIONS

German Patent Office, Office Action for corresponding German Application No. DE102017211720.6, dated Jul. 16, 2018.

(Continued)

*Primary Examiner* — Mark R Wendell
(74) *Attorney, Agent, or Firm* — Brooks Kushman P.C.

(57) ABSTRACT

A seat assembly having a support post, a headrest, and a latch mechanism. The latch mechanism may have first and second guide wires that control movement of the headrest along first and second axes, respectively. The latch mechanism may permit movement of the headrest along the first and second axes when in an unlatched position.

20 Claims, 11 Drawing Sheets

(56) References Cited

U.S. PATENT DOCUMENTS

| | | |
|---|---|---|
| 5,711,579 A | 1/1998 | Albrecht |
| 5,895,094 A | 4/1999 | Mod et al. |
| 6,068,337 A | 5/2000 | De Filippo |
| 6,290,299 B1 | 9/2001 | Frisch et al. |
| 6,361,113 B2 | 3/2002 | Heilig |
| 6,880,891 B2 | 4/2005 | Yetukuri et al. |
| 7,108,327 B2 | 9/2006 | Locke et al. |
| 7,137,668 B2 | 11/2006 | Kreitler |
| 7,306,287 B2 | 12/2007 | Linardi et al. |
| 7,316,455 B2 | 1/2008 | Metz et al. |
| 7,407,231 B2 | 8/2008 | Kraft et al. |
| 7,410,219 B2 | 8/2008 | Kraft et al. |
| 7,562,936 B1 | 7/2009 | Veine et al. |
| 7,621,598 B2 | 11/2009 | Humer et al. |
| 7,758,127 B2 | 7/2010 | Bokelmann et al. |
| 7,871,129 B2 * | 1/2011 | Boes ............ B60N 2/815 297/404 |
| 7,878,597 B2 | 2/2011 | Bokelmann et al. |
| 8,376,465 B2 | 2/2013 | Veine et al. |
| 8,794,705 B2 | 8/2014 | Steinmetz et al. |
| 8,894,142 B2 * | 11/2014 | Alexander ........ B60N 2/876 297/216.12 |
| 8,950,815 B2 | 2/2015 | Wang et al. |
| 9,283,877 B2 * | 3/2016 | Mizobata ........ B60N 2/888 |
| 2006/0250017 A1 | 11/2006 | Otto et al. |
| 2011/0187174 A1 * | 8/2011 | Tscherbner ...... B60N 2/815 297/408 |
| 2011/0291456 A1 * | 12/2011 | Poehlmann ...... B60N 2/815 297/410 |
| 2012/0080923 A1 * | 4/2012 | Kunert ............ B60N 2/815 297/391 |
| 2012/0235460 A1 * | 9/2012 | Fey ................ B60N 2/818 297/410 |
| 2013/0049428 A1 | 2/2013 | Reel |
| 2014/0145489 A1 | 5/2014 | Wang et al. |
| 2014/0327288 A1 * | 11/2014 | Groenninger ...... B60N 2/815 297/410 |
| 2015/0123445 A1 | 5/2015 | Mueller et al. |

FOREIGN PATENT DOCUMENTS

| | | |
|---|---|---|
| DE | 2426728 A1 | 12/1975 |
| DE | 3625691 A1 | 2/1988 |
| DE | 4222924 C1 | 9/1993 |
| DE | 29613073 U1 | 9/1996 |
| DE | 19648321 A1 | 6/1997 |
| DE | 19603911 A1 | 8/1997 |
| DE | 19714283 A1 | 11/1997 |
| DE | 19630473 A1 | 1/1998 |
| DE | 19632560 A1 | 2/1998 |
| DE | 102005043811 A1 | 5/2006 |
| DE | 102005043811 B4 | 7/2007 |
| DE | 102009033425 A1 | 3/2010 |
| DE | 102009020117 A1 | 11/2010 |
| DE | 102010041941 A1 | 4/2012 |
| DE | 102011010232 A1 | 8/2012 |
| EP | 0267503 A2 | 5/1988 |
| EP | 0864461 A1 | 9/1998 |
| EP | 0970846 * | 9/1998 |
| EP | 0965481 A1 | 12/1999 |
| EP | 0965482 A1 | 12/1999 |
| EP | 0970846 A1 | 1/2000 |
| EP | 0864461 B1 | 7/2000 |
| FR | 2537064 A1 | 6/1984 |
| FR | 2585647 A1 | 2/1987 |
| FR | 2585648 A1 | 2/1987 |
| FR | 2597813 A1 | 10/1987 |
| FR | 2745245 A1 | 8/1997 |
| FR | 2758296 B1 | 3/1999 |
| FR | 2771686 A1 | 6/1999 |
| FR | 2778879 A1 | 11/1999 |
| FR | 2796822 A1 | 2/2001 |
| FR | 2823808 A1 | 10/2002 |
| FR | 2848931 A1 | 6/2004 |
| GB | 2240920 A | 8/1991 |
| IT | 1256975 B | 12/1995 |
| IT | 1284668 B1 | 5/1998 |
| IT | 1291007 B1 | 12/1998 |
| JP | S5437628 A | 3/1979 |
| JP | S6074654 U | 3/1979 |
| JP | 59-182253 U | 12/1984 |
| JP | 60-160756 U | 10/1985 |
| JP | 61-079952 U | 5/1986 |
| JP | S59182252 A | 5/1986 |
| JP | H101107709 A | 4/1989 |
| JP | H029152 U | 1/1990 |
| JP | H0329046 U | 3/1991 |
| WO | 03059683 A1 | 7/2003 |

OTHER PUBLICATIONS

The State Intellectual Property Office of the Peoples Republic of China, Office Action for Chinese Patent Application No. 201710597901.7, dated Feb. 19, 2019.

\* cited by examiner

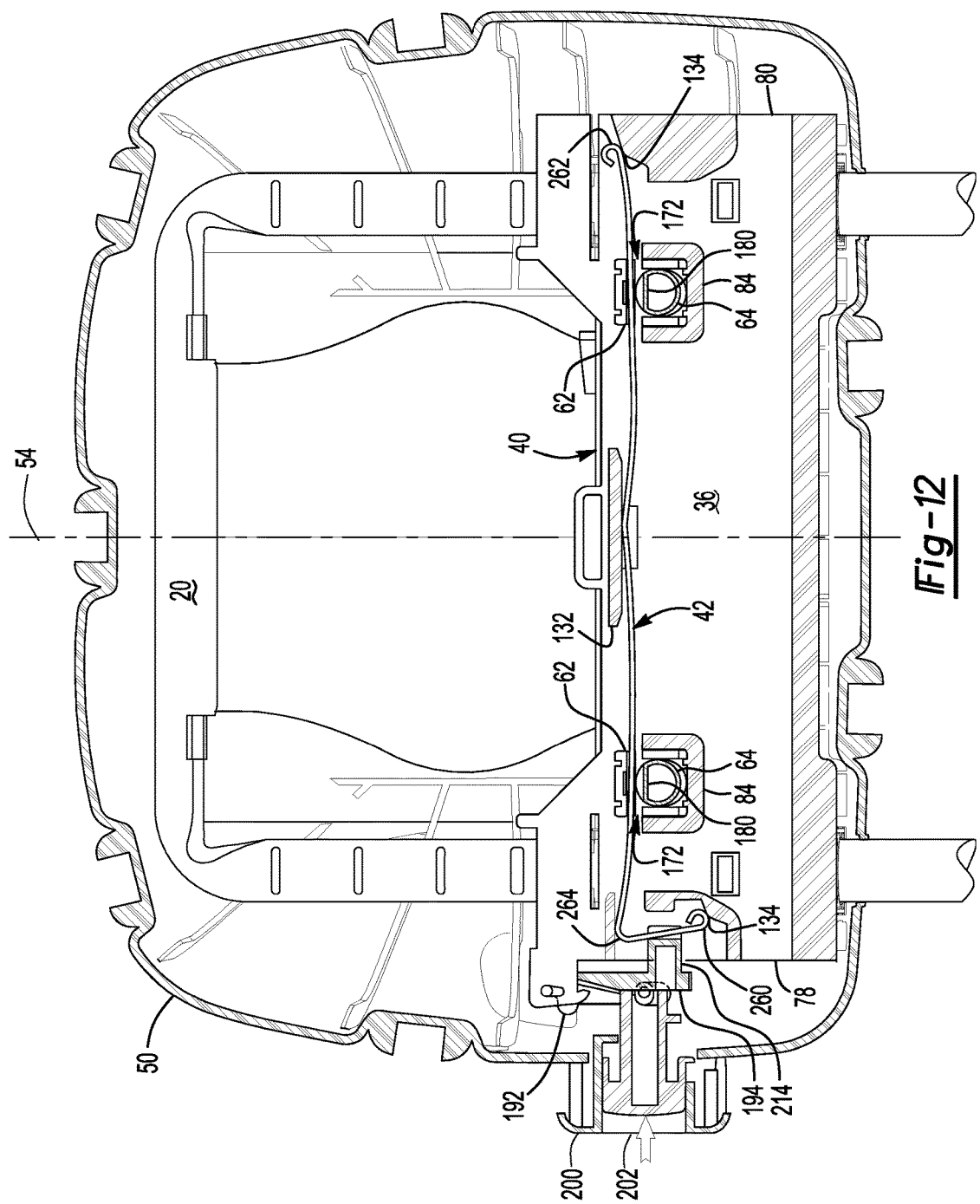

SEAT ASSEMBLY HAVING AN ADJUSTABLE HEAD RESTRAINT ASSEMBLY

CROSS-REFERENCE TO RELATED APPLICATIONS

This application claims the benefit of U.S. provisional application Ser. No. 62/364,435, filed Jul. 20, 2016, the disclosure of which is hereby incorporated in its entirety by reference herein.

TECHNICAL FIELD

This disclosure relates to a seat assembly having an adjustable head restraint assembly.

BACKGROUND

An adjustable head restraint assembly for a vehicle seat is disclosed in U.S. Pat. No. 7,562,936.

SUMMARY

In at least one configuration, a seat assembly is provided. The seat assembly may include a support post, a headrest, and a latch mechanism. The headrest may be movable with respect to the support post. The latch mechanism may have a first guide wire and a second guide wire. The first guide wire may control movement of the headrest along a first axis. The second guide wire may control movement of the headrest along a second axis. The latch mechanism may permit movement of the headrest along the first axis and the second axis when in an unlatched position.

In at least one configuration, a seat assembly is provided. The seat assembly may include a seat back, a support post, and a headrest. The support post may be fixedly positioned with respect to the seat back. The headrest may be movable along a first axis and a second axis with respect to the support post. The headrest may include a traverse member, a support post guide bushing, a slider rod guide bushing, a slider rod, and a latch mechanism. The traverse member may be disposed inside the headrest and may be movable along the first axis. The traverse member may have a support post opening and a slider rod opening. The support post guide bushing may be disposed inside the support post opening. The support post guide bushing may have a guide bushing passage and a first wire guide slot. The support post may extend through the guide bushing passage. The slider rod guide bushing may be disposed inside the slider rod opening. The slider rod guide bushing may have a slider bushing passage and a second wire guide slot. The slider rod may extend through the slider bushing passage and may be movable along the second axis with respect to the traverse member. The latch mechanism may have a first guide wire and a second guide wire. The first guide wire may control movement of the headrest along the first axis. The second guide wire may control movement of the headrest along the second axis. The first guide wire may be received in the first wire guide slot and the second guide wire may be received in the second wire guide slot when the latch mechanism is in a latched position.

BRIEF DESCRIPTION OF THE DRAWINGS

FIG. 12 is a section view of the head restraint assembly along section line 10-10 with the latch mechanism in the unlatched position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
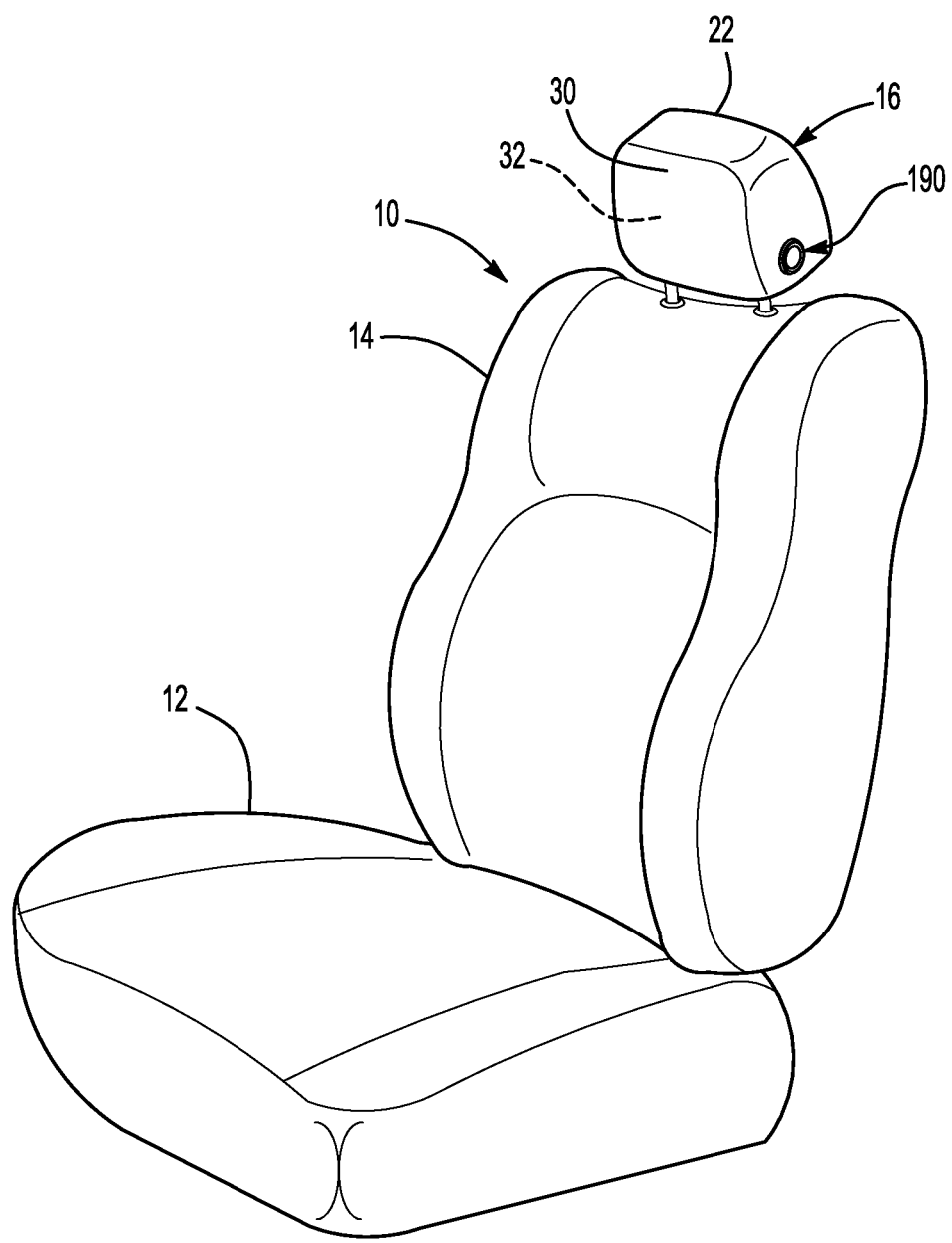
FIG. 1 is a perspective view of a seat assembly having a head restraint assembly.

Referring to FIG. 1, an example of a seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Figure 2:
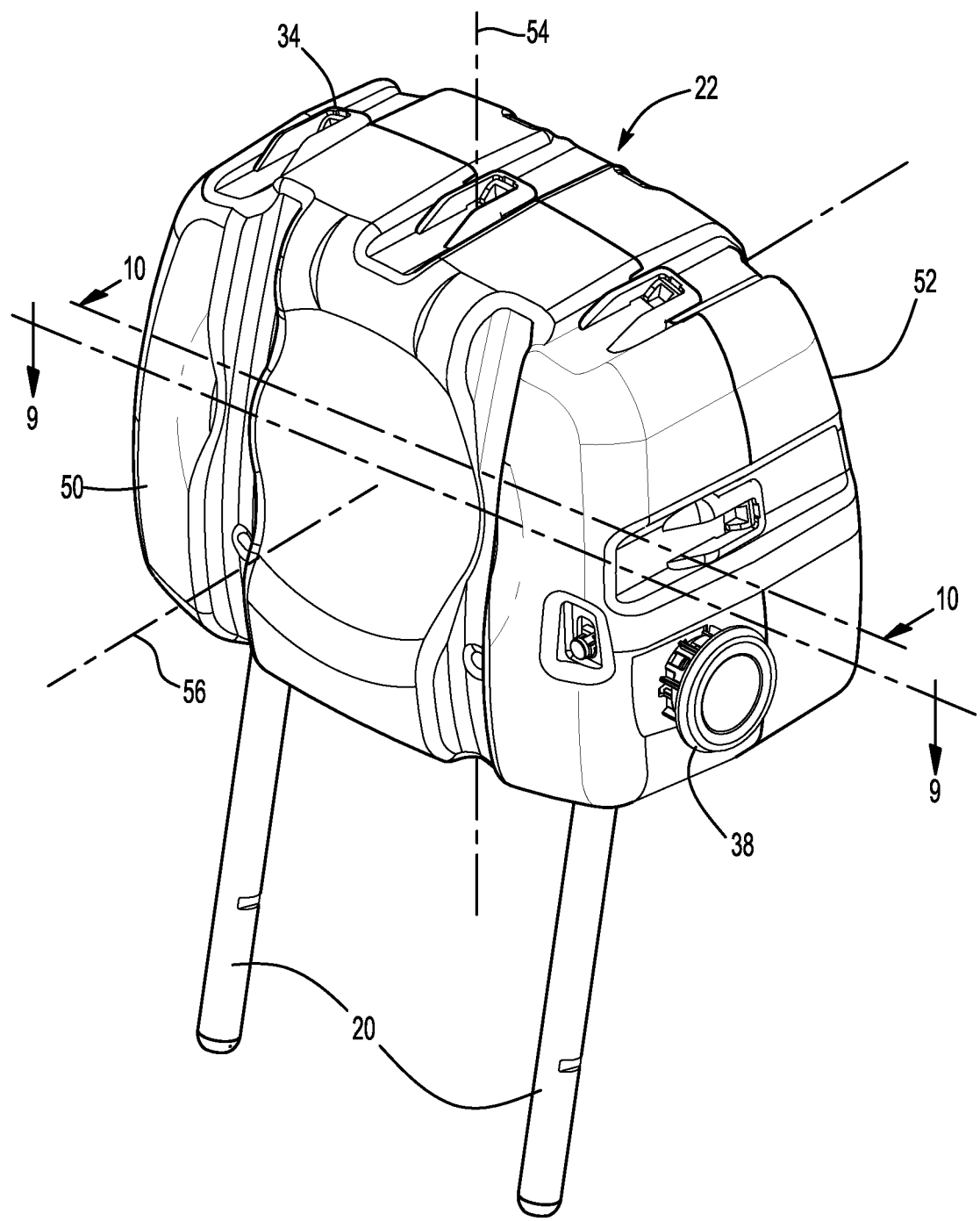
FIG. 2 is a perspective view of a head restraint assembly.

Referring to FIGS. 1 and 2, the head restraint assembly 16 may be disposed at the top of the seat back 14. The head restraint assembly 16 may move in multiple directions with respect to the seat back 14 as will be discussed in more detail below. The head restraint assembly 16 may include one or more support posts 20 and a headrest 22.

Figure 3:
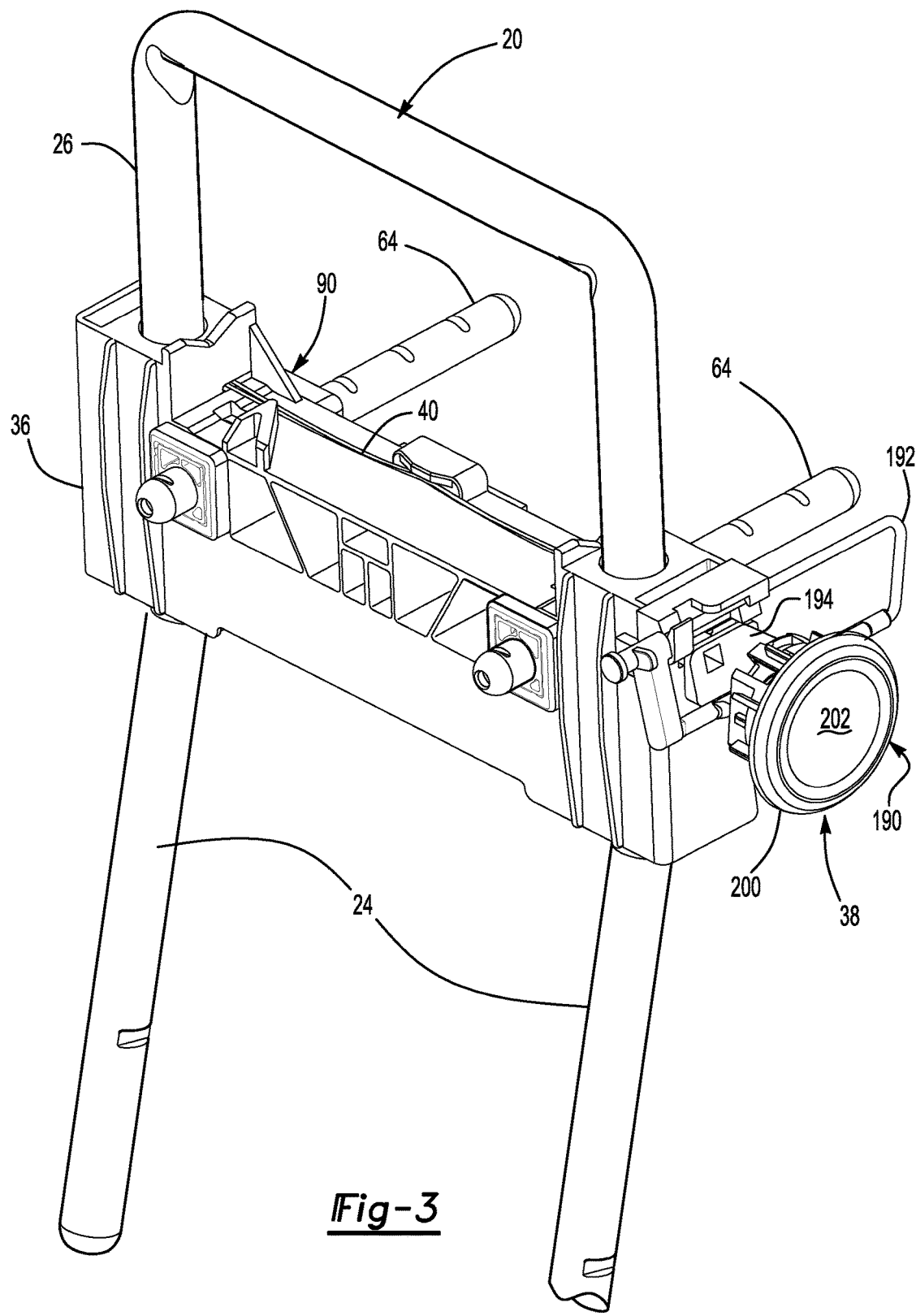
FIGS. 3 and 4 are perspective views of portions of the head restraint assembly.

Referring to FIGS. 2 and 3, one or more support posts 20 may extend from the seat back 14 to the headrest 22. The support post 20 may be made of any suitable material or materials, such as a metal or metal alloy. In FIG. 3, the support post 20 has a generally U-shaped configuration that may include a lower portion 24 and an upper portion 26.

The lower portion 24 may extend through the top of the seat back 14. In addition, the lower portion 24 may or may not move with respect to the seat back 14. For instance, the lower portion 24 may be disposed in a guide sleeve that may be disposed on the frame of the seat back 14 or may be part of an active head restraint system that is configured to move in response to a load force or vehicle impact event. Alternatively, the lower portion 24 may be fixedly mounted to a structural frame of the seat back 14 such that the support post 20 does not move with respect to the seat back 14.

Figure 4:
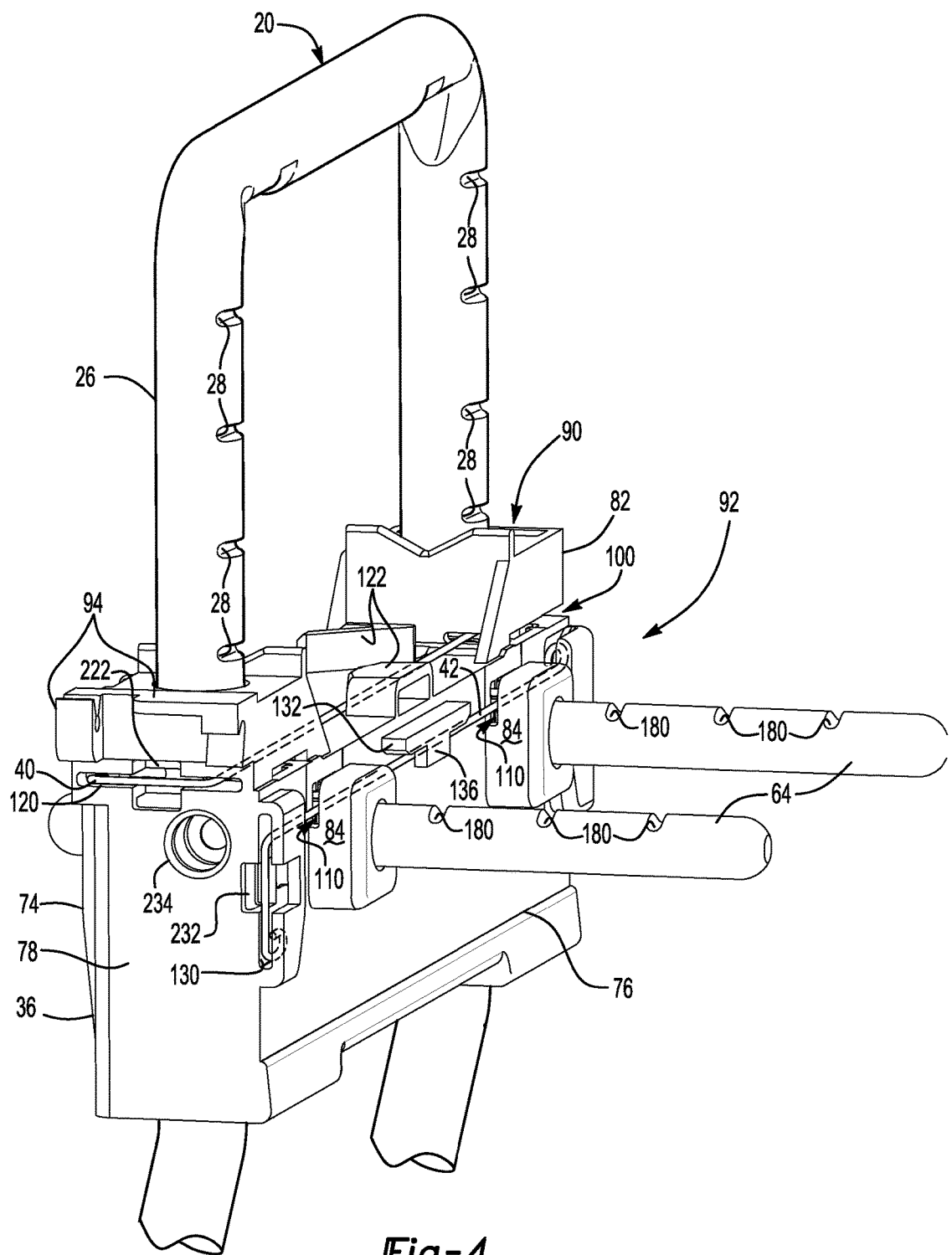

Referring to FIGS. 3 and 4, the upper portion 26 may or may not be coaxially disposed with the lower portion 24. In addition, the upper portion 26 may be integrally formed with the lower portion 24. In the configuration shown, the upper portion 26 is generally U-shaped and extends between two lower portions 24 of the support post 20. The upper portion 26 may be primarily disposed inside the headrest 22 and may be disposed closer to the head of a seat occupant than a part of the lower portion 24 that extends toward the seat back 14.

Referring to FIG. 4, the upper portion 26 may include a plurality of notches 28. The notches 28 may be spaced apart from each other and may be arranged vertically along the upper portion 26 with each notch 28 extending in a generally horizontal direction. It is also contemplated that the notches 28 may be provided along one leg of the lower portion 24 and/or upper portion 26 or both legs of the lower portion 24 and/or upper portion 26. The notches 28 may provide locking positions at which the headrest 22 may be positioned in a generally vertical position with respect to the seat back 14 or at which the headrest 22 may be positioned in a generally vertical position with respect to the support post 20.

Referring to FIGS. 1-3, the headrest 22 may be configured to support the head of an occupant of the seat assembly 10. In at least one configuration, the headrest 22 may include a trim cover 30, a cushion 32, a housing 34, a traverse member 36, and a latch mechanism 38. As is best shown in FIG. 4, the latch mechanism 38 may include a first guide wire 40 and a second guide wire 42.

Referring to FIG. 1, the trim cover 30 may cover at least a portion of a visible exterior surface of the headrest 22 and may be engaged by a seat occupant. The trim cover 30 may be made of any suitable material or materials, such as a fabric, vinyl, leather, or the like. The trim cover 30 may cover the cushion 32.

The cushion 32 may be disposed under at least a portion of the trim cover 30. In addition, the cushion 32 may be disposed between the trim cover 30 and the housing 34. The cushion 32 may be made of any suitable material or materials such as foam. The trim cover 30 and the cushion 32 are removed in FIG. 2 for clarity.

Referring to FIG. 2, the housing 34 may be disposed under the trim cover 30 and/or cushion 32. The housing 34 may provide a support structure that may support the cushion 32 and the trim cover 30. The housing 34 may be made of any suitable material or materials, such as a polymeric material. In addition, the housing 34 may define a cavity that at least partially receives the traverse member 36 and the latch mechanism 38, which are shown in FIG. 3. In at least one configuration, the housing 34 may include a front housing portion 50 and a rear housing portion 52 that may be disposed at the front and back of the headrest 22, respectively. The front housing portion 50 and the rear housing portion 52 may be fastened to each other and may move in a generally vertical direction along a first axis 54 with respect to the seat back 14 and/or the support post 20 and in a fore/aft or front/back direction along a second axis 56 with respect to the support post 20. Alternatively, the front housing portion 50 may move in a fore/aft or front/back direction with respect to the support post 20 and the rear housing portion 52 while the rear housing portion 52 may not move in a fore/aft or front/back direction. In such a configuration, the rear housing portion 52 may be fixedly positioned with respect to the traverse member 36. The first axis 54 may be disposed substantially perpendicular to the second axis 56 in one or more embodiments.

Referring to FIG. 3, the traverse member 36 may be movably disposed on the support post 20. For example, the traverse member 36 may be configured to slide along the support post 20 in a generally vertical direction. The traverse member 36 may be provided as a single component or as multiple components. As is best shown in FIG. 5, the headrest 22 may receive one or more support post guide bushings 60, one or more slider rod guide bushings 62, and one or more slider rods 64.

Figure 5:
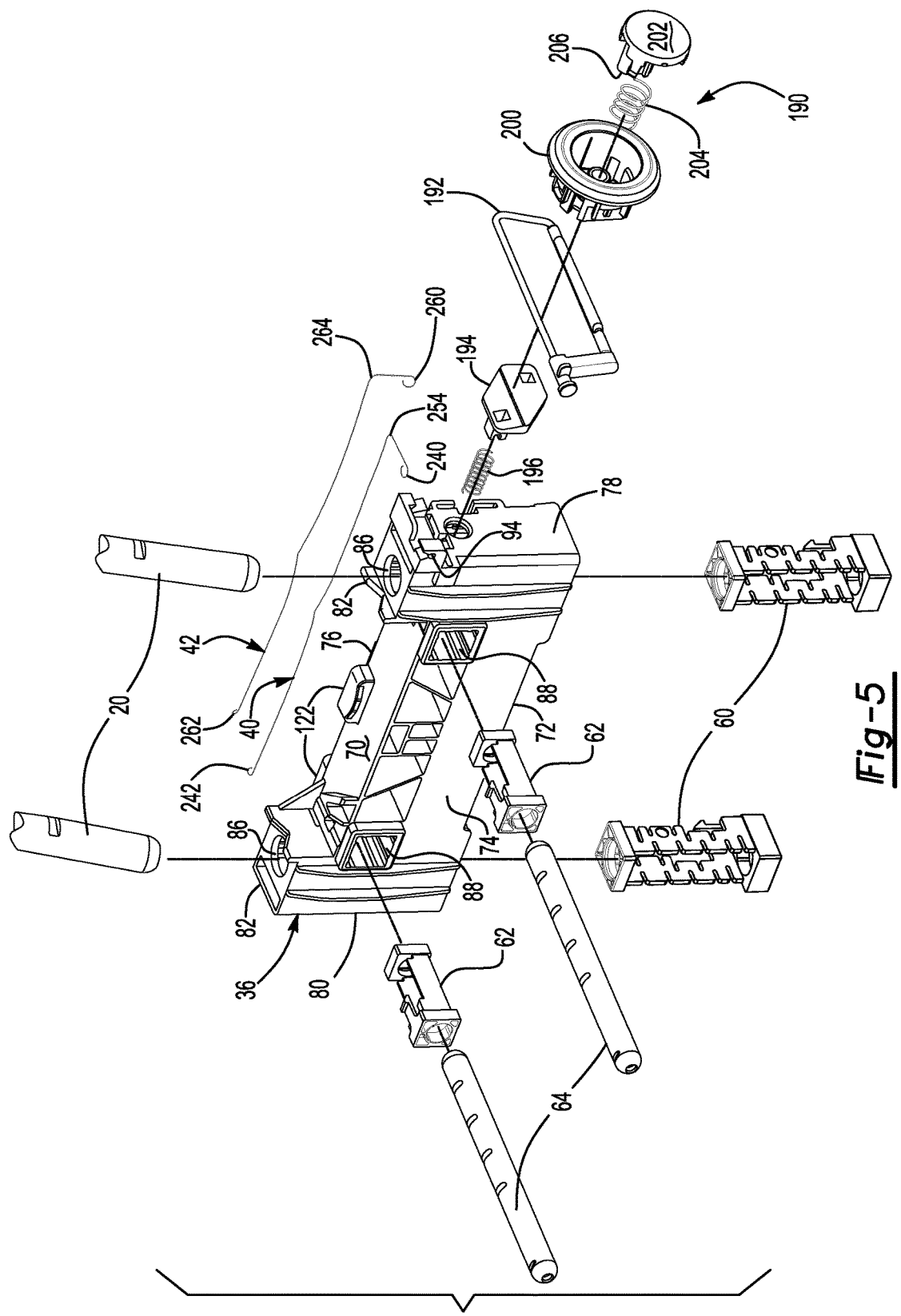
FIG. 5 is an exploded view of a portion of the head restraint assembly.

Referring to FIGS. 4 and 5, the traverse member 36 may be disposed inside the headrest 22 and may be movable along the first axis 54 with respect to the support post 20. In at least one configuration, the traverse member 36 may include a top side 70, a bottom side 72, a front side 74, a rear side 76, a first lateral side 78, a second lateral side 80, one or more support post blocks 82, one or more slider blocks 84, one or more support post openings 86, one or more slider rod openings 88, a first wire guide arrangement 90, a second wire guide arrangement 92, and a pivot mechanism mount 94.

The top side 70 may face away from the seat back 14 and toward the top of the headrest 22.

The bottom side 72 may be disposed opposite the top side 70. As such, the bottom side 72 may face toward the seat back 14.

The front side 74 may face toward the front of the headrest 22. For example, the front side 74 may face toward the front housing portion 50. The front side 74 may extend from the top side 70 to the bottom side 72.

The rear side 76 may be disposed opposite the front side 74. As such, the rear side 76 may face toward the rear housing portion 52. The rear side 76 may extend from the top side 70 to the bottom side 72.

The first lateral side 78 may face toward a button of the latch mechanism 38. The first lateral side 78 may extend between the top side 70 and the bottom side 72 and between the front side 74 and the rear side 76.

The second lateral side 80 may be disposed opposite the first lateral side 78. The second lateral side 80 may extend between the top side 70 and the bottom side 72 and between the front side 74 and the rear side 76.

One or more support post blocks 82 may protrude from the top side 70. In the configuration shown, two support post blocks 82 are shown that are spaced apart from each other and disposed proximate opposite lateral sides of the traverse member 36. A support post opening 86 may extend through a support post block 82. In addition, a support post block 82 may receive the support post 20 and a portion of a support post guide bushing 60. A support post block 82 may have a support post block slot 100. The support post block slot 100 may receive a portion of a first guide wire 40 as will be discussed in more detail below. In at least one configuration, support post block slot 100 may be defined by the support post block 82 and the top side 70.

One or more slider blocks 84 may protrude from the rear side 76. In the configuration shown, two slider blocks 84 are provided that are spaced apart from each other. The slider blocks 84 may be disposed closer to the center of the traverse member 36 than the support post 20 and the support post blocks 82. A slider rod opening 88 may extend through a slider blocks 84. In addition, a slider block 84 may receive a slider rod 64 and a portion of a slider rod guide bushing 62. A slider block 84 may have a slider block slot 110. The slider block slot 110 may receive a portion of a second guide wire 42 as will be discussed in more detail below. In at least one configuration, the slider block slot 110 may be defined by the slider blocks 84 and the rear side 76. The slider block slot 110 may be an open-ended slot that may be open in a direction that extends toward the top side 70.

One or more support post openings 86 may extend through the traverse member 36. In the configuration shown, two support post openings 86 are provided that are spaced apart from each other and disposed near opposite lateral sides of the traverse member 36. A support post opening 86 may be a through hole that may extend through a support post block 82 to an opposite side of the traverse member 36, such as the bottom side 72. Moreover, a support post opening 86 may extend along the first axis 54 or parallel to the first axis 54. A support post opening 86 may receive the support post 20 and a support post guide bushing 60.

One or more slider rod openings 88 may extend through the traverse member 36. In the configuration shown, two slider rod openings 88 are provided that are spaced apart from each other. A slider rod opening 88 may be a through hole that may extend through a slider block 84 to an opposite side of the traverse member 36, such as the front side 74. Moreover, a slider rod opening 88 may extend along the second axis 56 or parallel to the second axis 56. As such, the slider rod openings 88 may be disposed substantially perpendicular to the support post openings 86. A slider rod opening 88 may receive a slider rod guide bushing 62 and a slider rod 64 and may facilitate movement of a slider rod 64 with respect to the traverse member 36.

Figure 9:
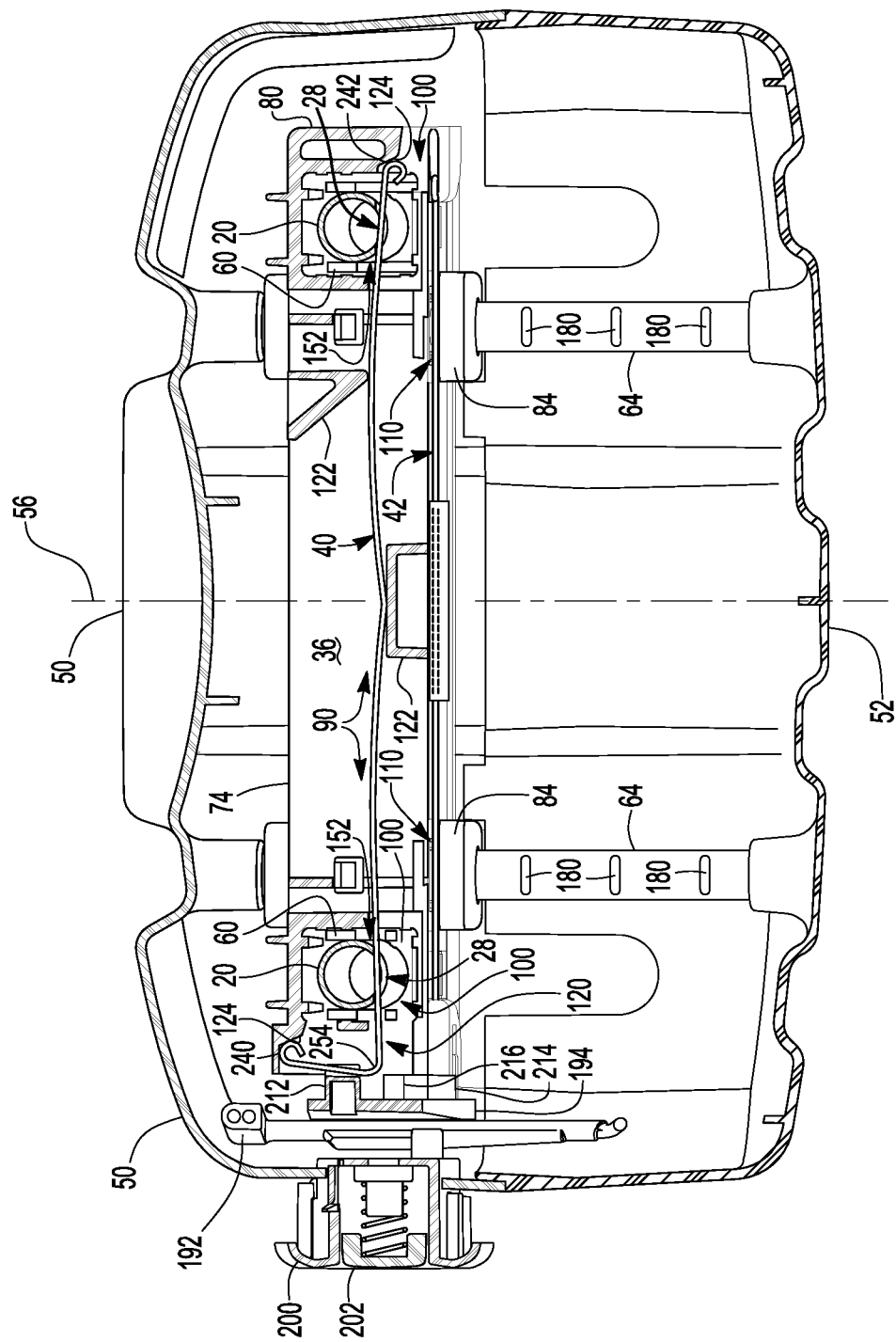
FIG. 9 is a section view of the head restraint assembly along section line 9-9 with the latch mechanism in a latched position.

Referring to FIGS. 4 and 9, the first wire guide arrangement 90 may facilitate positioning of a first guide wire 40. The first wire guide arrangement 90 may include one or more features that may help orient the first guide wire 40. For instance, the first wire guide arrangement 90 may include one or more slots, protrusions, and ramps that may position and guide movement of the first guide wire 40. In the configuration shown, the first wire guide arrangement 90 includes the support post block slots 100, a first end slot 120, one or more protrusions 122, and at least one ramp 124.

The support post block slots 100 may receive the first guide wire 40 and may constrain movement of the first guide wire 40 in multiple directions. As is best shown in FIG. 4, the support post block slots 100 may extend in a generally horizontal direction. The support post block slots 100 may permit the first guide wire 40 to move in a lateral direction or between the first lateral side 78 and the second lateral side 80 of the traverse member 36 while constraining vertical movement of the first guide wire 40.

Referring to FIGS. 4 and 9, the first end slot 120 may extend from the first lateral side 78 toward the second lateral side 80. For example, the first end slot 120 may extend from the first lateral side 78 to an adjacent support post block slot 100. The first end slot 120 may also extend in a generally horizontal direction extend between the front side 74 and the rear side 76. The first end slot 120 may receive an end of the first guide wire 40 and may receive a portion of an actuator plate of the latch mechanism 38 as will be discussed in more detail below.

Referring to FIGS. 4 and 9, one or more protrusions 122 may be provided that may help position the first guide wire 40 and limit movement of the first guide wire 40 in at least one direction. Multiple protrusions 122 may be provided that may constrain movement of the first guide wire 40 in a forward/backward direction while permitting lateral movement. The protrusions 122 may extend from a top side 70 of the traverse member 36. In addition, the protrusions 122 may be disposed near the center of the traverse member 36 between the slider rods 64 and slider rod openings 88.

Referring to FIG. 9, one or more ramps 124 may be provided that may be configured to bend or flex the first guide wire 40. A pair of ramps 124 may be disposed proximate opposite lateral ends of the traverse member 36. One ramp 124 may be disposed inside the first end slot 120 while another ramp 124 may be disposed adjacent to a support post block slot 100 that may be disposed proximate the second lateral side 80. The ramps 124 may be disposed proximate and may engage opposing ends of the first guide wire 40. The ramps 124 and protrusions 122 may cooperate to cause the first guide wire 40 to bend or flex away from the support post 20 and out of corresponding notches 28 in the support post 20 when the first guide wire 40 is actuated toward the second lateral side 80. The ramps 124 and protrusions 122 may cooperate to cause the first guide wire 40 to bend or flex toward the support post 20 and into corresponding notches 28 when the first guide wire 40 moves toward the first lateral side 78 of the traverse member 36.

Figure 10:
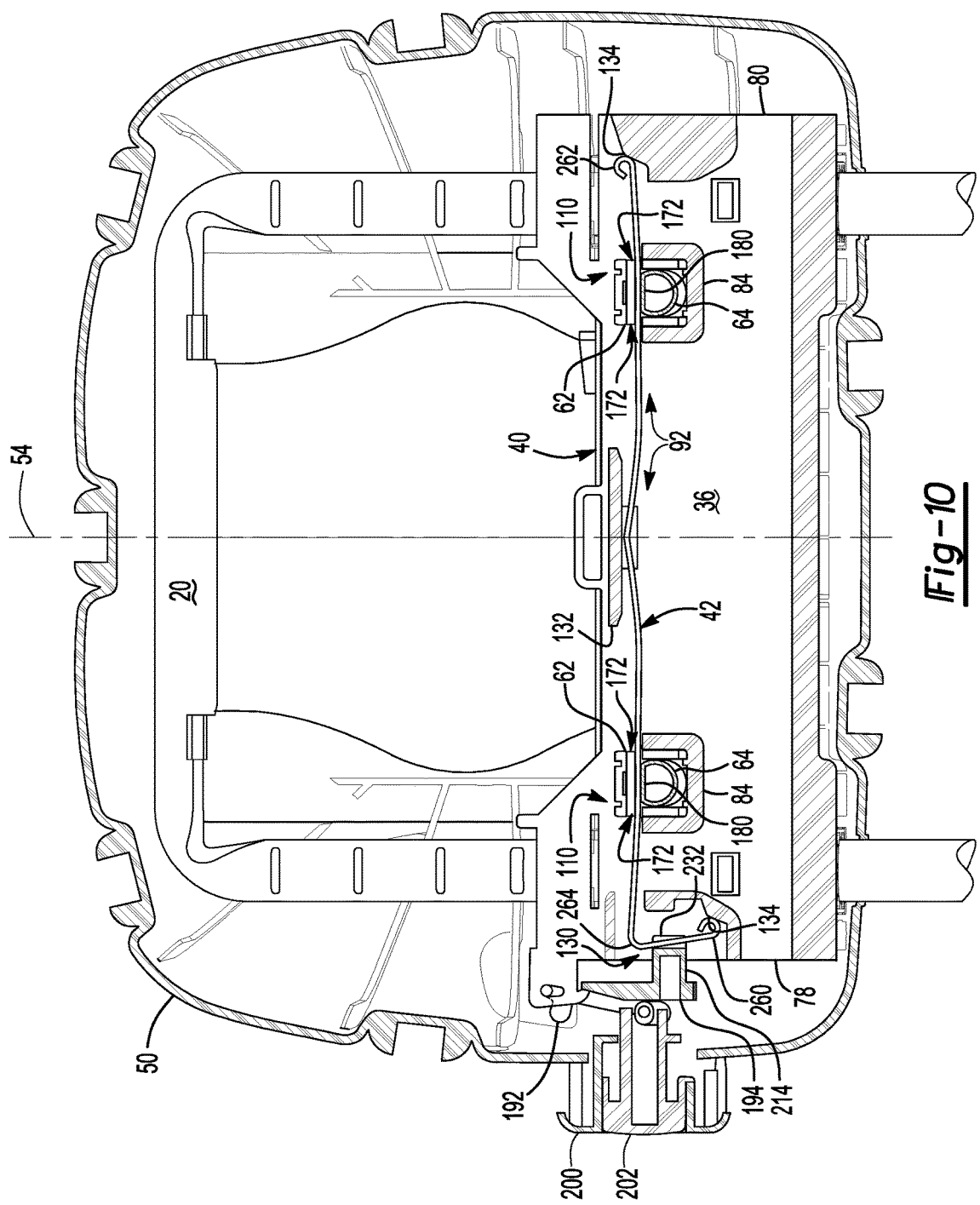
FIG. 10 is a section view of the head restraint assembly along section line 10-10 with the latch mechanism in the latched position.

Referring to FIGS. 4 and 10, the second wire guide arrangement 92 may facilitate positioning of a second guide wire 42. The second wire guide arrangement 92 may include one or more features that may help orient the second guide wire 42. For instance, the second wire guide arrangement 92 may include one or more slots, protrusions, and ramps that may position and guide movement of the second guide wire 42. In the configuration shown, the second wire guide arrangement 92 includes the slider block slots 110, a second end slot 130, one or more protrusions 132, and at least one ramp 134.

The slider block slots 110 may receive the second guide wire 42 and may constrain movement of the second guide wire 42 in multiple directions. As is best shown in FIG. 4, the slider block slots 110 may extend in a generally horizontal direction. The slider block slots 110 may permit the second guide wire 42 to move in a lateral direction or between the first lateral side 78 and the second lateral side 80 of the traverse member 36 while constraining generally horizontal movement of the second guide wire 42 or movement of the second guide wire 42 along or parallel to the second axis 56.

Referring to FIG. 4, the second end slot 130 may extend from the first lateral side 78 toward the second lateral side 80. For example, the second end slot 130 may be spaced apart from the first end slot 120 and may extend from the first lateral side 78 to or toward an adjacent slider block slot 110. The second end slot 130 may also extend in a generally vertical direction extend between the top side 70 and the bottom side 72. The second end slot 130 may receive an end of the second guide wire 42 and may receive a portion of an actuator plate of the latch mechanism 38 as will be discussed in more detail below.

Referring to FIGS. 4 and 10, one or more protrusions 132 may be provided that may help position the second guide wire 42 and limit movement of the second guide wire 42 in at least one direction. As is best shown in FIGS. 10, a protrusion 132 may be provided that may constrain movement of the second guide wire 42 in a forward/backward direction and in an upward direction while permitting lateral movement. The protrusion 132 may extend from the rear side 76 of the traverse member 36 and may have a hook 136 that may extend over the top of the second guide wire 42 to inhibit movement of the second guide wire 42 toward the top side 70. The hook 136 may be open in a direction that faces toward the seat back 14. As such, the hook 136 may permit movement of the second guide wire 42 in a generally horizontal direction while inhibiting movement of the second guide wire 42 in one or more directions, such as along the first axis 54.

Referring to FIG. 10, one or more ramps 134 may be provided that may be configured to bend or flex the second guide wire 42. A pair of ramps 134 may be disposed proximate opposite lateral ends of the traverse member 36. One ramp 134 may be disposed inside the second end slot 130 while another ramp 134 may be disposed near the slider block slot 110 that may be disposed proximate the second lateral side 80. The ramps 134 may be disposed proximate and may engage opposing ends of the second guide wire 42. The ramps 134 and protrusions 132 may cooperate to cause the second guide wire 42 to bend or flex away from the slider rods 64 and out of corresponding notches in the slider rods 64 when the second guide wire 42 is actuated toward the second lateral side 80. The ramps 134 and protrusions 132 may cooperate to cause the second guide wire 42 to bend or flex toward the slider rods 64 and into corresponding notches when the second guide wire 42 moves toward the first lateral side 78 of the traverse member 36.

Referring to FIGS. 4 and 5, the pivot mechanism mount 94 may be disposed proximate an end of the first lateral side 78 of the traverse member 36. The pivot mechanism mount 94 may facilitate mounting of at least a portion of the latch mechanism 38 to the traverse member 36.

Figure 6:
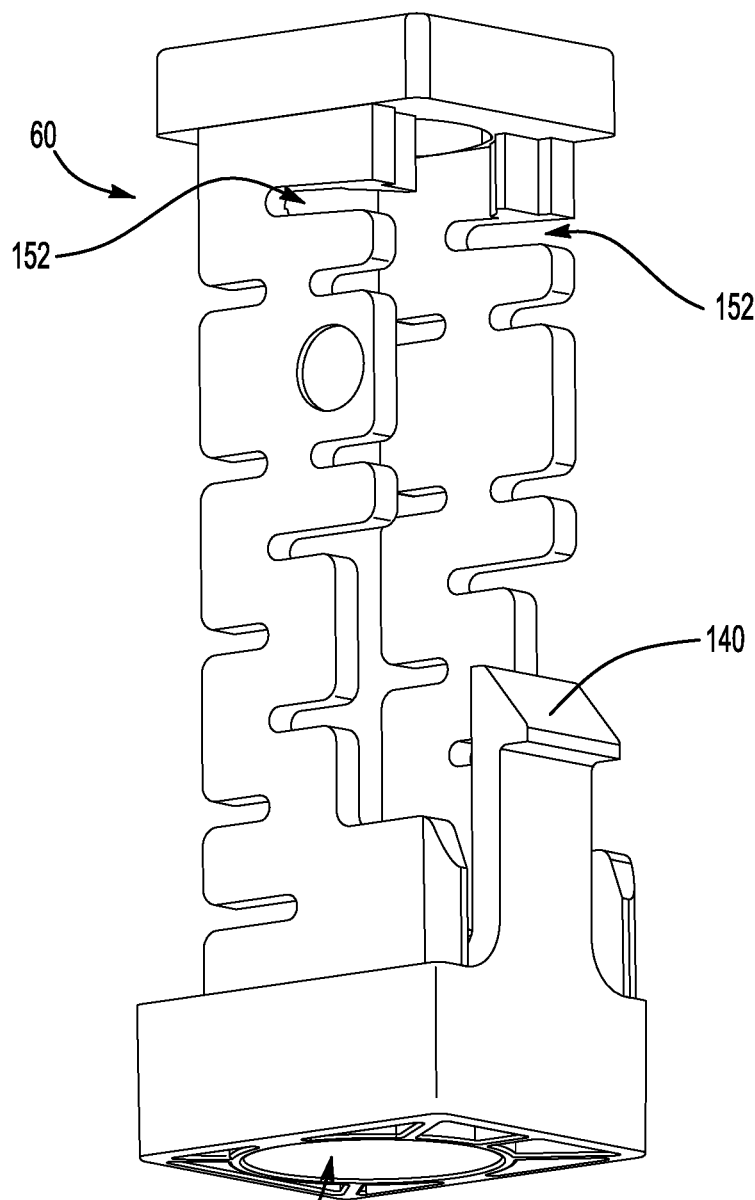
FIG. 6 is a perspective view of a support post guide bushing.

Referring to FIGS. 5 and 6, one or more support post guide bushings 60 may be provided to guide movement of the headrest 22 with respect to the support post 20. More specifically, a support post guide bushing 60 may guide movement of the traverse member 36 along the support post 20. A support post guide bushing 60 may be received in a corresponding support post opening 86 and may be partially received in a support post block 82. The support post guide bushing 60 may be fixedly coupled to the traverse member 36 in any suitable manner. For example, the support post guide bushing 60 may be fixedly coupled to the traverse member 36 with a retaining feature 140, such as a snap tab, that may be received in a corresponding opening in the traverse member 36. In addition, a lower end of the support post guide bushing 60 may be larger than an upper end of the support post guide bushing 60 that may be disposed opposite the lower end. As such, the lower end may inhibit movement of the support post guide bushing 60 toward the top side 70 of the traverse member 36 while the retaining feature 140 may inhibit removal of the support post guide bushing 60 or movement of the support post guide bushing 60 toward the bottom side 72 of the traverse member 36. In at least one configuration, the support post guide bushing 60 may include a support post guide bushing passage 150 and one or more first wire guide slots 152.

Referring to FIG. 6, the support post 20 may extend through the support post guide bushing passage 150. The support post guide bushing passage 150 may extend substantially parallel to the first axis 54.

Figure 11:
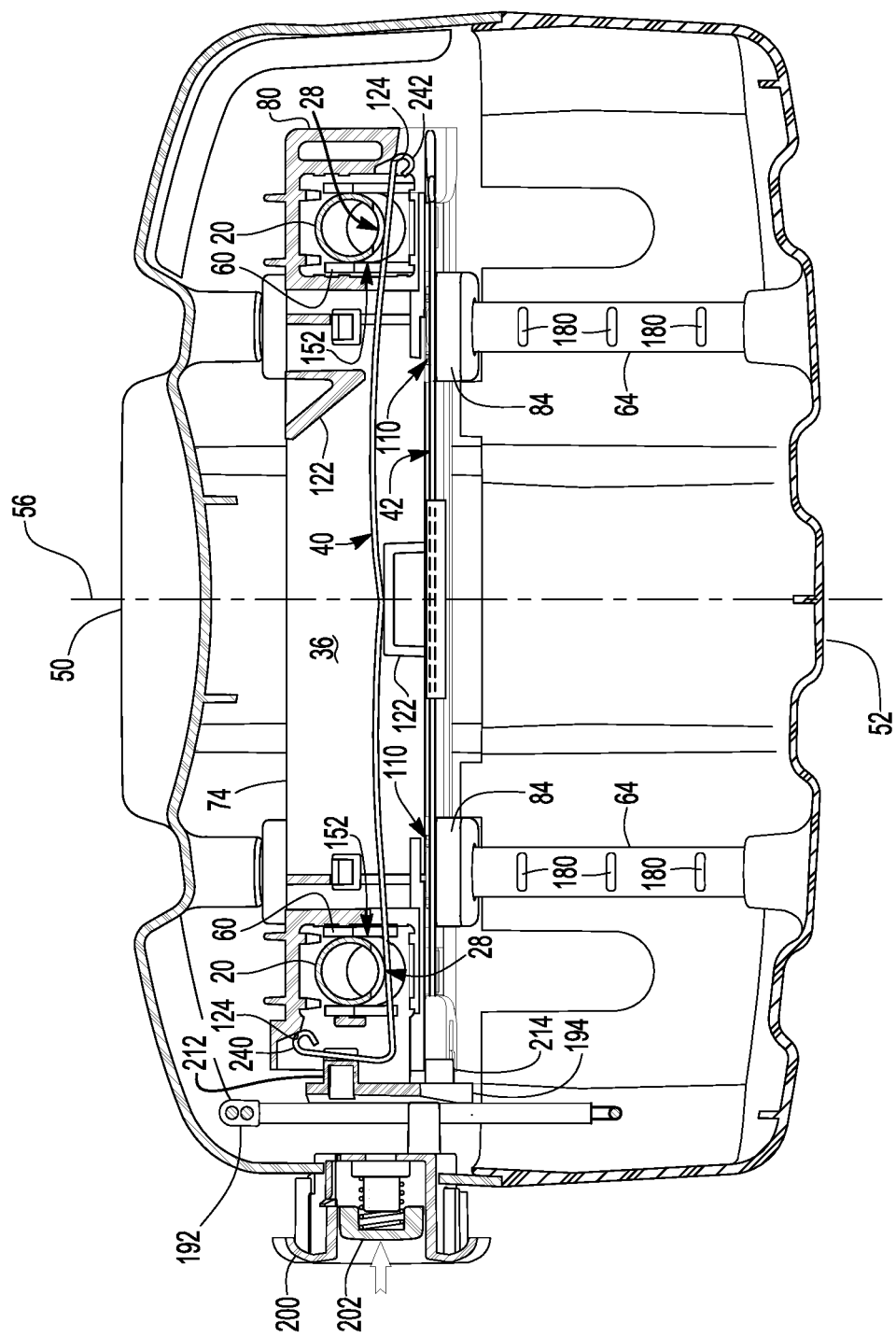
FIG. 11 is a section view of the head restraint assembly along section line 9-9 with the latch mechanism in an unlatched position.

One or more first wire guide slots 152 may be defined by the support post guide bushing 60. The first wire guide slot 152 may be an elongated slot that may be oriented to extend between the front side 74 and the rear side 76 of the traverse member 36. In the configuration shown, two first wire guide slots 152 are provided that are disposed on opposing lateral walls of the support post guide bushing 60. The first wire guide slots 152 may be aligned with a corresponding support post block slot 100. As is best shown in FIG. 9, the first guide wire 40 may be received in at least one first wire guide slot 152 when the latch mechanism 38 is in the latched position. As is best shown in FIG. 11, the first guide wire 40 may not be received in at least one first wire guide slot 152 when the latch mechanism 38 is in the unlatched position.

Figure 7:
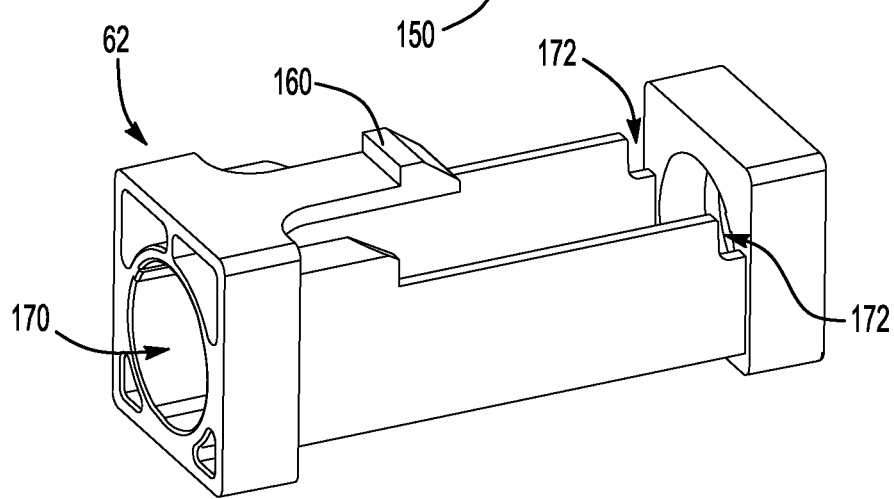
FIG. 7 is a perspective view of a slider rod guide bushing.

Referring to FIGS. 5 and 7, one or more slider rod guide bushings 62 may be provided to guide fore/aft movement of the headrest 22 with respect to the support post 20. More specifically, a slider rod guide bushing 62 may guide movement of the slider rods 64 with respect to the support post 20 and the traverse member 36 in a direction that extends along the second axis 56. A slider rod guide bushing 62 may be received in a corresponding slider rod opening 88 and may be partially received in a slider block 84. The slider rod guide bushing 62 may be fixedly coupled to the traverse member 36 in any suitable manner. For example, the slider rod guide bushing 62 may be fixedly coupled to the traverse member 36 with a retaining feature 160, such as a snap tab, that may be received in a corresponding opening in the traverse member 36. In addition, one end of the slider rod guide bushing 62 may be larger than an opposite end of the slider rod guide bushing. As such, the enlarged end may inhibit movement of the slider rod guide bushing 62 in one direction, such as toward the rear side 76 of the traverse member 36 while the retaining feature 160 may inhibit removal of the slider rod guide bushing 62 or movement of the slider rod guide bushing 62 toward an opposite side of the traverse member 36, such as the front side 74. In at least one configuration, the slider rod guide bushing 62 may include a slider bushing passage 170 and one or more second wire guide slots 172.

Referring to FIG. 7, the slider rod 64 may extend through the slider bushing passage 170. The slider bushing passage 170 may extend substantially parallel to the second axis 56.

One or more second wire guide slots 172 may be defined by the slider rod guide bushing 62. The second wire guide slot 172 may be an elongated slot that may be oriented to extend between the top side 70 and the bottom side 72 of the traverse member 36. In the configuration shown, two second wire guide slots 172 are provided that are disposed on opposing lateral walls of the slider rod guide bushing 62. The second wire guide slots 172 may be aligned with a corresponding slider block slot 110. As is best shown in FIG. 10, the second guide wire 42 may be received in at least one second wire guide slot 172 when the latch mechanism 38 is in the latched position. As is best shown in FIG. 12, the second guide wire 42 may not be received in at least one second wire guide slot 172 when the latch mechanism 38 is in the unlatched position.

Referring to FIGS. 3-5 and 9, one or more slider rods 64 may extend from the traverse member 36 to the housing 34 of the headrest 22. In the configuration shown, a pair of slider rods 64 are provided that are separate components that are spaced apart from each other and that extend through a corresponding slider rod opening 88 in the traverse member 36. It is also contemplated that the slider rods 64 may be integrally formed and may have a ring-shaped configuration or a substantially U-shaped configuration that may be disposed inside the headrest 22.

A slider rod 64 may extend from the front housing portion 50 toward or to the rear housing portion 52. A slider rod 64 may be received in and may extend through a slider rod opening 88 and a slider rod guide bushing 62. In addition, a slider rod 64 may slide along the second axis 56 or in a direction that extends parallel to the second axis 56 with respect to the traverse member 36. For example, the slider rods 64 may slide in a generally fore/aft or forward/backward direction with respect to the traverse member 36. As such, the housing 34 may slide along the second axis 56 with the slider rods 64 and with respect to the traverse member 36.

Referring to FIGS. 4 and 9, the slider rod 64 may include a plurality of slider rod notches 180. The slider rod notches 180 may be spaced apart from each other and may be disposed substantially parallel to each other. In addition, the slider rod notches 180 may be arranged and spaced apart in a generally horizontal direction along a slider rod 64 and each slider rod notch 180 may extend in a lateral direction. The slider rod notches 180 may provide locking positions at which the headrest 22 may be positioned in a fore/aft, forward/backward, or generally horizontal direction with respect to the support post 20 in the traverse member 36. The slider rod notches 180 may face toward and may receive a second guide wire 42 as will be discussed in more detail below.

Referring to FIGS. 3 and 5, the latch mechanism 38 may facilitate locking and unlocking of the headrest 22 from the support post 20 and locking and unlocking of the slider rods 64 from the traverse member 36. The latch mechanism 38 may include the first guide wire 40 and the second guide wire 42 as previously discussed. In addition, the latch mechanism 38 may include a button assembly 190, a pivot mechanism 192, an actuator plate 194, and an actuator biasing member 196.

Referring to FIGS. 3 and 5, the button assembly 190 may be provided to control operation of a portion of the latch mechanism 38. For example, the button assembly 190 may be configured to operate or actuate a latch mechanism 38 to selectively enable or disable movement of at least a portion of the head restraint assembly 16. In at least one configuration, the latch mechanism 38 may inhibit movement of the headrest 22 with respect to the support post 20 when in a locked condition and may permit movement of the headrest 22 along the first axis 54 and the second axis 56 when in an unlocked condition. The button assembly 190 may include a bezel 200, a button 202, and a button biasing member 204.

The bezel 200 may facilitate mounting of the button assembly 190. For example, the bezel 200 may be disposed on the housing 34 of the headrest 22. The bezel 200 may include a body that at least partially defines an opening for receiving the button 202. The bezel 200 may be made of any suitable material, such as a polymeric material, and may be integrally formed as a one-piece component. The bezel 200 may extend through the trim cover 30 and the cushion 32 toward the first lateral side 78 of the traverse member 36. The bezel 200 may have an annular flange that may engage the trim cover 30 to help provide a desired aesthetic appearance.

The button 202 may be moveably received in the bezel 200. The button 202 may be made of any suitable material, such as a polymeric material, and may be integrally formed as a one-piece component. The button 202 may include an outer surface that may be engaged by a user when the button 202 is pressed. The button 202 may also include one or more pivot mechanism engagement arms 206.

The pivot mechanism engagement arm 206 may extend away from the outer surface of the button 202 and toward the pivot mechanism 192. In at least one configuration, the pivot mechanism engagement arm 206 may have a groove or recess that may receive in engage at least a portion of the pivot mechanism 192.

Referring to FIG. 5, the button biasing member 204 may be disposed between the button 202 and the bezel 200 or between the button 202 and the actuator plate 194. The button biasing member 204 may exert a biasing force upon the button 202 that may urge the button 202 away from the traverse member 36. The button biasing member 204 may be of any suitable type, such as a spring.

The pivot mechanism 192 may be pivotally disposed on the traverse member 36 proximate the second end. For example, the pivot mechanism 192 may be pivotally disposed on the pivot mechanism mount 94. The pivot mechanism 192 may rotate with respect to the pivot mechanism mount 94. The pivot mechanism 192 may have any suitable configuration. In the embodiment shown in FIG. 5, the pivot mechanism 192 has a generally rectangular configuration in which an upper portion of the pivot mechanism 192 is received in the pivot mechanism mount 94 and a lower portion of the pivot mechanism 192 is engageable by the pivot mechanism engagement arm 206. The pivot mechanism 192 may be disposed between the button 202 and the actuator plate 194. In addition, the pivot mechanism 192 may help hold the actuator plate 194 against the traverse member 36.

Figure 8:
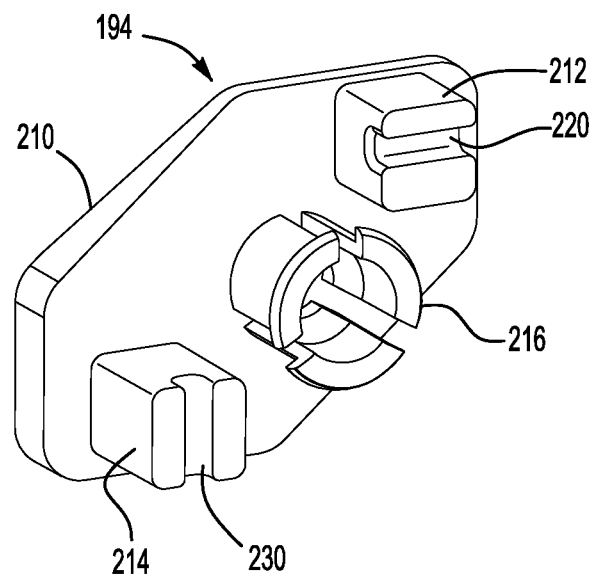
FIG. 8 is a perspective view of an actuator plate.

Referring to FIGS. 5 and 8, the actuator plate 194 may be disposed between the pivot mechanism 192 and the first lateral side 78 of the traverse member 36. The actuator plate 194 may be configured to transmit force from the button 202 and the pivot mechanism 192 to the first guide wire 40 and the second guide wire 42. The actuator plate 194 may be configured to move linearly in a direction that may extend between the first lateral side 78 and the second lateral side 80 of the traverse member 36. In at least one configuration, the actuator plate 194 may have a body 210, a first engagement feature 212, a second engagement feature 214, and a biasing member mounting feature 216.

Referring to FIG. 8, the body 210 may be disposed adjacent to the pivot mechanism 192 and may engage the pivot mechanism 192. The body 210 may be aligned with the first lateral side 78.

The first engagement feature 212 may extend from the body 210 toward the traverse member 36. The first engagement feature 212 may protrude from the body 210 and may engage the first guide wire 40. Moreover, the first engagement feature 212 may include a first groove 220 that may couple the first engagement feature 212 to the first guide wire 40 while allowing the first guide wire 40 to rotate in the first groove 220. In addition, the first engagement feature 212 may be received in a first receiving opening 222 of the traverse member 36, which is best shown in FIG. 4. The first receiving opening 222 may extend from the first lateral side 78 and may extend from the first end slot 120. As such, the first engagement feature 212 and the first receiving opening 222 may cooperate to align the actuator plate 194 to the traverse member 36.

Referring to FIG. 8, the second engagement feature 214 may be spaced apart from the first engagement feature 212. The second engagement feature 214 may extend from the body 210 toward the traverse member 36. The second engagement feature 214 may protrude from the body 210 and may engage the second guide wire 42. Moreover, the second engagement feature 214 may include a second groove 230 that may couple the second engagement feature 214 to the second guide wire 42 while allowing the second guide wire 42 to rotate in the second groove 230. In addition, the second engagement feature 214 may be received in a second receiving opening 232 of the traverse member 36 as is best shown in FIG. 4. The second receiving opening 232 may extend from the first lateral side 78 and may extend from the second end slot 130. As such, the second engagement feature 214 and the second receiving opening 232 may cooperate to align the actuator plate 194 to the traverse member 36.

Referring to FIG. 8, the biasing member mounting feature 216 may be disposed between and may be spaced apart from the first engagement feature 212 and the second engagement feature 214. In addition, the biasing member mounting feature 216 may be received in a third receiving opening 234 of the traverse member 36 as is best shown in FIG. 4. The biasing member mounting feature 216 may help align and position the actuator biasing member 196. For example, the biasing member mounting feature 216 may receive the actuator biasing member 196.

Referring to FIG. 5, the actuator biasing member 196 may extend from the traverse member 36 to the actuator plate 194. The actuator biasing member 196 may urge the actuator plate 194 away from the first lateral side 78. The actuator biasing member 196 may have any suitable configuration. For example, the actuator biasing member 196 may be a spring. The actuator biasing member 196 may be received in a third receiving opening 234 and may extend to a support post guide bushing 60.

Referring to FIGS. 5 and 9, the first guide wire 40 may be provided to selectively latch and unlatch the traverse member 36 to the support post 20. The first guide wire 40 may extend across the top side 70 of the traverse member 36 and may generally extend between the first lateral side 78 and the second lateral side 80 of the traverse member 36. The first guide wire 40 may extend from a first guide wire end 240 to a second guide wire end 242 that is disposed opposite the first guide wire end 240.

The first guide wire end 240 may be curled along a curve or arc. The first guide wire end may be disposed proximate and may engage the ramp 124.

The first guide wire 40 may extend from the first guide wire end 240 toward the rear of the traverse member 36 and to a bend 254. The actuator plate 194 may engage the first guide wire 40 between the first guide wire end 240 and the bend 254.

The first guide wire 40 may extend from the bend 254 across the traverse member 36 toward the second lateral side 80 of the traverse member 36. In doing so, the first guide wire may extend through the support post block slots 100 and between the protrusions 122. The segment of the first guide wire 40 that is located between the bend 254 and the second guide wire end 242 may engage the support post 20 and may be received in corresponding notches 28 when the button 202 is not pressed and the latch mechanism 38 is in a latched position. In addition, the segment of the first guide wire 40 that is located between the bend 254 and the second guide wire end 242 may be generally linear or may have a small amount of curvature when in a nominal position and may not include any pins or notches that may receive another component.

The second guide wire end 242 may be curled along a curve or arc. The second guide wire end 242 may be disposed proximate and may engage a ramp 124 that may be disposed proximate the second lateral side 80 of the traverse member 36.

Referring to FIGS. 5 and 10, the second guide wire 42 may be provided to selectively latch and unlatch the slider rods 64 with respect to the traverse member 36. The second guide wire 42 may generally extend across the rear side 76 of the traverse member 36 between the first lateral side 78 and the second lateral side 80 of the traverse member 36. The second guide wire 42 may extend from a third guide wire end 260 to a fourth guide wire end 262 that may be disposed opposite the third guide wire end 260.

The third guide wire end 260 may be curled along a curve or arc. The third guide wire end 260 may be disposed proximate and may engage a ramp 134 that may be disposed proximate the first lateral side 78 of the traverse member 36.

The second guide wire 42 may extend from the third guide wire end 260 toward the top of the traverse member 36 and to a bend 264. The actuator plate 194 may engage the second guide wire 42 between the third guide wire end 260 and the bend 264.

The second guide wire 42 may extend from the bend 264 across the traverse member 36 toward the second lateral side 80 of the traverse member 36. In doing so, the second guide wire 42 may extend through the slider block slots 110 and between or along the protrusions 132. The segment of the second guide wire 42 that is located between the bend 264 and the fourth guide wire end 262 may engage the slider rods 64 and may be received in corresponding slider rod notches 180 when the button 202 is not pressed and the latch mechanism 38 is in a latched position.

The fourth guide wire end 262 may be curled along a curve or arc. The fourth guide wire end 262 may be disposed proximate and may engage a ramp 134 that may be disposed proximate the second lateral side 80 of the traverse member 36.

The latch mechanism 38 may move from a latched position, shown in FIGS. 9 and 10, to an unlatched position, shown in FIGS. 11 and 12, to permit movement of the headrest 22. To enable movement of the headrest 22 the button 202 may be actuated. Actuation of the button 202 may exert force on the pivot mechanism 192, which may rotate and actuate the actuator plate 194 toward the second lateral side 80. The actuator plate 194 may exert force on the first guide wire 40 and the second guide wire 42. Force exerted on the first guide wire 40 and the second guide wire 42 may cause the first guide wire 40 and the second guide wire 42 to move along corresponding ramps 124, 134 of the traverse member 36. Movement of the first guide wire 40 and the second guide wire 42 along corresponding ramps 124, 134 may cause the first guide wire 40 and the second guide wire 42 to bend or flex. More specifically, the first guide wire 40 may bend or flex away from the support post 20 and may exit corresponding notches 28 on the support post 20, which may allow the traverse member 36 and the headrest 22 to be manually actuated along the support post 20 along the first axis 54 or in a generally vertical direction. Similarly, the second guide wire 42 may bend or flex away from the slider rods 64 and may exit corresponding slider rod notches 180 of the slider rods 64, which may allow the slider rods 64 to be manually actuated with respect to the traverse member 36 along the second axis 56 in a generally forward/backward direction. As such, pressing the button 202 may allow the headrest 22 to be moved in multiple directions independently or simultaneously.

Releasing the button 202 may allow the latch mechanism 38 to return to the latched position. More specifically, releasing the button 202 may allow the button 202 to return to its original position under the influence of the button biasing member 204. Releasing the button 202 may also allow the pivot mechanism 192 and the actuator plate 194 to be free to return to their original positions under the biasing force of the actuator biasing member 196 and optionally the first guide wire 40 and the second guide wire 42. For example, the first guide wire 40 and the second guide wire 42 may be resilient and may be free to return to their original or generally linear positions when the button 202 is released.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A seat assembly comprising:
   a support post;
   a headrest that is moveable with respect to the support post;
   a traverse member through which the support post extends, wherein the traverse member is disposed inside the headrest and is moveable along a first axis;
   a slider rod that extends through the traverse member, wherein the slider rod is disposed inside the headrest and is moveable along a second axis with respect to the traverse member; and
   a latch mechanism having a first guide wire that controls movement of the headrest along the first axis and a second guide wire that controls movement of the headrest along the second axis, wherein the latch mechanism permits movement of the headrest along the first axis and the second axis when in an unlatched position.

2. The seat assembly of claim 1 wherein the first axis is disposed substantially perpendicular to the second axis.

3. The seat assembly of claim 1 wherein the latch mechanism further comprises a button and an actuator plate, wherein the actuator plate is disposed between the button and the traverse member and is engageable with the first guide wire and the second guide wire.

4. The seat assembly of claim 3 wherein the actuator plate exerts force on the first guide wire and the second guide wire to disengage the first guide wire from the support post and disengage the second guide wire from the slider rod when the button actuates the actuator plate toward the traverse member.

5. The seat assembly of claim 3 wherein the actuator plate has a body, a first engagement feature that protrudes from the body to engage the first guide wire, and a second engagement feature that protrudes from the body to engage the second guide wire.

6. The seat assembly of claim 5 wherein the first engagement feature is received in a first receiving opening in the traverse member.

7. The seat assembly of claim 6 wherein the second engagement feature is received in a second receiving opening in the traverse member.

8. The seat assembly of claim 7 wherein the actuator plate further comprises a biasing member mounting feature that is disposed between the first engagement feature and the second engagement feature, wherein a biasing member is received in the biasing member mounting feature and extends from the actuator plate to the traverse member to urge the actuator plate away from the traverse member.

9. The seat assembly of claim 1 wherein the first guide wire is receivable in a first wire guide slot of a support post guide bushing and the second guide wire is receivable in a second wire guide slot of a slider rod guide bushing.

10. A seat assembly comprising:
    a seat back;
    a support post that is fixedly positioned with respect to the seat back; and
    a headrest that is moveable along a first axis and a second axis with respect to the support post, the headrest including:
    a traverse member that is disposed inside the headrest, wherein the traverse member is moveable along the first axis and has a support post opening and a slider rod opening;
    a support post guide bushing that is disposed inside the support post opening and that has a guide bushing passage through which the support post extends and a first wire guide slot;
    a slider rod guide bushing that is disposed inside the slider rod opening and that has a slider bushing passage and a second wire guide slot;
    a slider rod that extends through the slider bushing passage and is moveable along the second axis with respect to the traverse member; and
    a latch mechanism that has a first guide wire that controls movement of the headrest along the first axis and a second guide wire that controls movement of the headrest along the second axis, wherein the first guide wire is received in the first wire guide slot and the second guide wire is received in the second wire guide slot when the latch mechanism is in a latched position.

11. The seat assembly of claim 10 wherein the first guide wire is received in a notch in the support post and the second guide wire is received in a notch in the slider rod when the latch mechanism is in the latched position.

12. The seat assembly of claim 10 wherein the first guide wire is not received in the first wire guide slot and the second guide wire is not received in the second wire guide slot when the latch mechanism is in an unlatched position in which the headrest is simultaneously moveable along the first axis and the second axis.

13. The seat assembly of claim 10 wherein the traverse member has top side that faces away from the seat back, wherein the first guide wire extends across the top side.

14. The seat assembly of claim 13 wherein the traverse member has a support post block that protrudes from the top side and that has a support post block slot that is defined by the support post block and the top side, wherein the first guide wire extends through the support post block slot.

15. The seat assembly of claim 14 wherein the support post guide bushing is partially received in the support post block.

16. The seat assembly of claim 10 wherein the traverse member has a rear side that faces toward the rear side of the headrest, wherein the second guide wire extends across the rear side of the traverse member.

17. The seat assembly of claim 16 wherein the traverse member has a slider block that protrudes from the rear side of the traverse member and that has a slider block slot that is defined by the slider block and the rear side, wherein the second guide wire extends through the slider block slot.

18. The seat assembly of claim 17 wherein the slider rod guide bushing is partially received in the slider block.

19. The seat assembly of claim 17 wherein the traverse member has a protrusion that protrudes from the rear side of the traverse member and that has a hook that inhibits movement of the second guide wire along the first axis and the second axis.

20. The seat assembly of claim 19 wherein the hook is open in a direction that faces toward the seat back and the slider block slot is open in a direction that faces away from the seat back.

* * * * *